Feb. 20, 1951     S. RUBEN     2,542,574
ALKALINE DRY CELL
Filed June 5, 1946
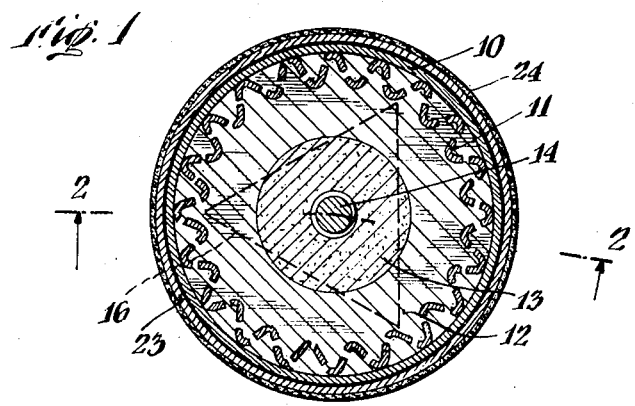
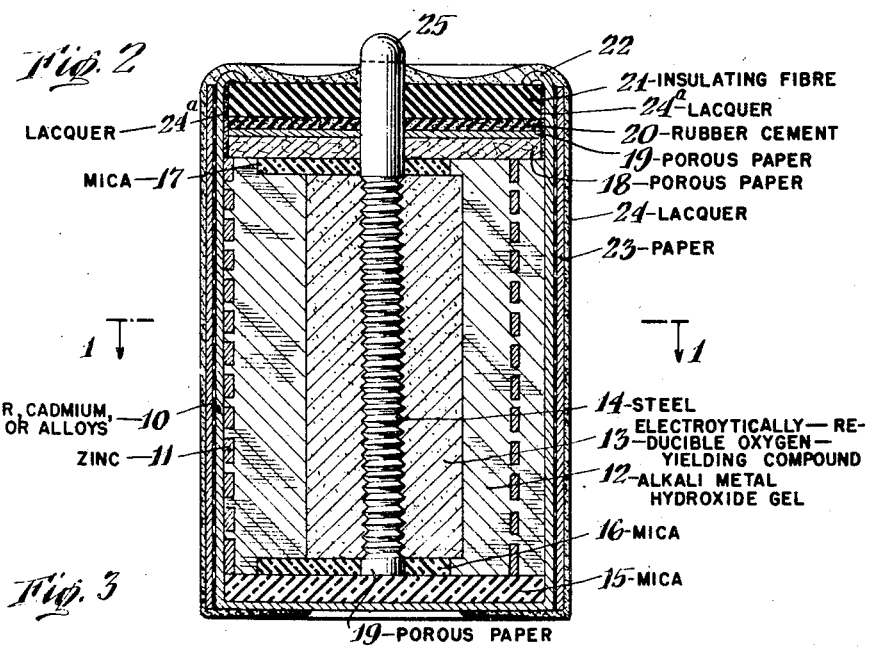
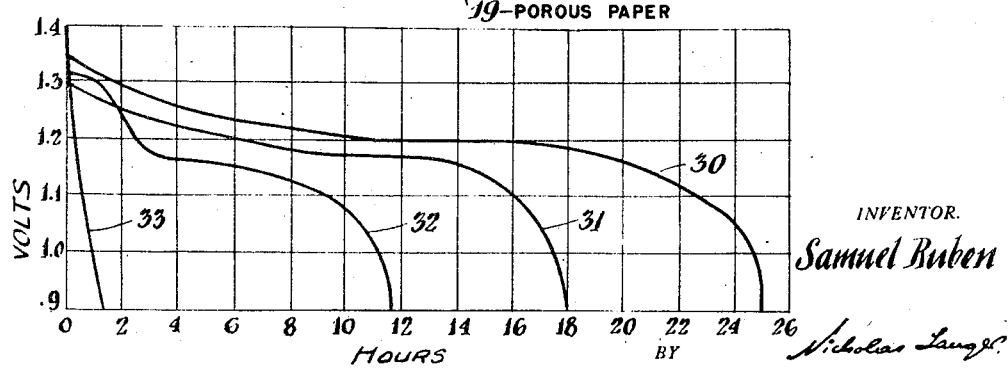
INVENTOR.
Samuel Ruben
BY Nicholas Langer
ATTORNEY Patented Feb. 20, 1951

2,542,574

UNITED STATES PATENT OFFICE 2,542,574

ALKALINE DRY CELL

Samuel Ruben, New Rochelle, N. Y.

Application June 5, 1946, Serial No. 674,588

9 Claims. (Cl. 136—107)

This invention relates to alkaline dry cells.

This application is a continuation-in-part of my prior-filed copending application, Serial No. 662,001, filed April 13, 1946 (now abandoned), and is related to my co-pending applications Serial Nos. 671,200 and 682,734, filed May 21, 1946 and July 11, 1946, respectively.

In my co-pending application Serial No. 662,001, I have disclosed and claimed an alkaline primary cell comprising an amalgamated zinc can and a corrugated and perforated amalgamated zinc lining member having its corrugations in pressure contact with the inner wall surface of the can, said can and said lining member jointly constituting the anode of the cell.

In my co-pending application Serial No. 671,200, I have disclosed and claimed an alkaline primary cell comprising a zinc anode, a cathode in the form of a coherent conductive body containing an electrolytically reducible oxygen-yielding compound, and a gel electrolyte including an aqueous solution of an alkali metal hydroxide and a compatible gelling agent.

In my co-pending application Serial No. 682,734, I have disclosed and claimed an alkaline primary cell comprising a zinc anode, a cathode of depolarizing material, an electrolyte, and an anode terminal of a metal inert to the electrolyte and having low electrolytic potential with respect to zinc, the quantity of zinc in the anode being balanced with respect to the quantity of oxygen in the cathode available for depolarization.

An object of the invention is to improve alkaline primary cells.

It is another object of the invention to provide an alkaline primary cell of novel and improved character comprising a can of metal inert to the electrolyte and having low electrolytic potential with respect to zinc and a corrugated and perforated zinc anode having its corrugations in pressure contact with the inner wall surface of the can whereby an anode of great surface-to-volume ratio is provided. This type of anode, in combination with the other features of the invention, such as the use of a gelled alkaline electrolyte substantially completely embedding the anode, greatly facilitates effective use of the cell materials.

Other objects will be apparent from the following description and claims.

In the drawings:

Figures 1 and 2 are transverse and longitudinal sections, respectively, of an alkaline dry cell embodying features of the invention; and Figure 3 is a graph of output voltage versus time under load for certain cells of the present invention and for prior art cells.

The present invention contemplates a dry primary cell structure embodying an electrolyte formed of an aqueous alkaline solution which is immobilized by a compatible addition agent, preferably a material which converts the electrolyte into a gel.

The preferred electrolyte comprises an aqueous alkali metal hydroxide solution which is gelled with an alkali metal salt of carboxymethylcellulose, such as sodium carboxymethylcellulose. Sodium carboxymethylcellulose is a cellulose derivative that is readily soluble or dispersible in water, and is supplied by Hercules Powder Co., Wilmington, Delaware, as a white granular powder.

It is also contemplated, for long shelf life under adverse temperature conditions, that the electrolyte may, in some cases, contain a substantial proportion of dissolved alkali metal zincate. Other features of the electrolyte and the preferred method of making it will be described in connection with the making of the specific cell structures shown in the drawings.

Figures 1 and 2 illustrate a dry cell comprising a drawn zinc can 10 and a corrugated and perforated zinc sheet 11 which together comprise the cell anode, a gell electrolyte 12, and a cathode comprising a pressed cylinder 13 of a conductive composition including an electrolytically-reducible oxygen-yielding compound such as a metal oxide or permanganate, the cylinder 13 being pressed on a threaded steel rod 14.

Anode member 11 is made by perforating a 10 mil zinc sheet with 325 holes of 33 mils diameter per square inch, and corrugating the sheet with 14 corrugations per inch to an overall thickness of 35 mils. The member 11 is one and one-half inches square. Zinc can 10 is one half inch in inside diameter and one and seven-eighths inches long.

The can 10 and anode member 11 are amalgamated before use by immersion in a 1% solution of mercuric nitrate at 55° C. for one minute, after which they are washed and placed in a 30% solution of KOH at 100° C. for 30 minutes to promote diffusion of mercury into the zinc. The parts are then washed and dried. In order to reduce any tendency for electrolyte creepage over the top edge of the zinc can it is preferably treated with an alkali metal silicate, such as sodium silicate. For example, the zinc can may be dipped in a concentrated solution of sodium silicate to form a film 24a of sodium silicate extending down the inside wall of can 10 about one third of an inch. This dries to a hard film which appears to render the zinc passive to alkalies and to prevent alkali creepage along the zinc.

In assembling the cell an insulating disc 15, of mica or polystyrene, one half inch in diameter is placed in the bottom of the can and corrugated anode member 11, bent into a cylinder, is forced into position over the disc, the corrugations pressing against the inside wall of the zinc can. Anode member 11 has a higher surface area than the inside wall of can 10 and together with the can wall provides a zinc electrode of high surface area.

Electrolyte 12 comprises an aqueous alkali solution immobilized as a gel. The preferred electrolyte is formed of:

C. P. potassium hydroxide (88%
  KOH) _____ grams__ 100
Zinc oxide _____ do____ 16
Water _____ ml__ 100

This solution is immobilized with 6 grams of sodium carboxymethylcellulose per 100 millilitres of the alkali zincate solution. The potassium hydroxide is added to 25 millilitres of water and the zinc oxide added. The mixture is stirred and heated to 180–190° C. and then allowed to cool to 110° C. after which 25 ml. of water is added and the solution stirred and cooled to 80° C. The remaining 50 ml. of water is added, a clear solution being obtained. The sodium carboxymethylcellulose is crushed and screened through a 40 mesh screen and is added slowly to the solution, with constant stirring.

This dispersion is placed in the anode can assembly, 4.6 grams (about 3 cc.) being used. The can is then placed in an oven or oil bath and heated to slightly below the boiling point of the mixture (about 117–120° C.) at which point a clear liquid solution is obtained which, upon cooling, will form a true gel. The can is then removed from the oven or oil bath and the steel rod 14 carrying pressed cathode layer 13 is inserted.

The cathode assembly is formed by pressing the depolarizer composition 13 onto threaded steel rod 14 so that the composition is bonded to the threads and forms good electrical contact therewith. A steel rod 0.16 inches in diameter threaded with an 8–32 thread is suitable. Ten grams of a depolarizer composition formed of finely divided mercuric oxide intimately mixed with 5% of graphite pressed onto the rod with a pressure of about 2500 pounds per square inch forms a cylinder about .312 mil in diameter and 1.5 inches long.

The steel rod protrudes at the ends of the depolarizer cylinder. Triangular mica washers 16 and 17 are pressed onto the bottom and top ends of the rod against the ends of the depolarizer cylinder 13, for centering the cathode and the cathode assembly is inserted in the anode can assembly. As the cathode assembly is lowered into the cell the hot liquid electrolyte rises to the top of the zinc anode member 11 and then solidifies to form a gel as it cools, the gel filling all free spaces between cathode 13 and can 10 and covering both sides of anode member 11.

A washer 18 of porous paper, such as a 60 mil sheet of pure cotton fibre paper, known as Feltril paper, is laid over the top surface of the gelled electrolyte and is impregnated with 0.05 cc. of mineral oil to provide an oil seal at the top of the cell. A second paper washer 19, which may also be Feltril paper, is laid on top of washer 18 and a layer 20 of a sealing cement, such as the synthetic rubber cement sold under the trademark Pliobond, is poured on top of the washer 19 and allowed to harden. A stiff insulating fibre washer 21 is placed over this and the edge 22 of the can 10 is turned in over this disc.

A sheath 23 of strong paper is cemented to the outside of can 10 and serves to strengthen the can wall, which is somewhat brittle due to amalgamation with mercury. The entire cell can be dipped in a lacquer solution and dried to form a coating film 24 for added protection and to improve the cell apperance. The film is left off the bottom of can 10 and the projecting terminal 25 of rod 14 to permit electric contact with the cell terminals. Terminal 25 is preferably tinned to improve the contact.

Instead of steel for rod 14, other metals can be used which are relatively inert to the electrolyte and depolarizer used, such as the other iron group metals. In case a silver oxide depolarizer is used, a silver plated metal rod can be employed. Instead of threads, other formations may be provided on the surface of the rod to provide anchoring for the cathode, such as longitudinal grooves, spaced recesses or projections, and the like.

While mercuric oxide has been described as the preferred depolarizer material, other electrolytically reducible metal oxides and permanganates can be substituted therefor, such as cupric oxide, silver oxide, etc.

The potassium hydroxide in the electrolyte may vary in concentration, the most useful range extending from 39 to 54% KOH. The proportion of sodium carboxymethylcellulose can vary, the range between 3 and 12 grams per 100 ml. of electrolyte being most suitable. With proportions of potassium hydroxide below 80 grams per 100 ml. of water (39% KOH) the electrolyte does not appear to form a homogeneous clear gel with the sodium carboxymethylcellulose, probably due to free water. Heating of the electrolyte mixture substantially to the boiling point is also essential to obtaining a clear homogeneous gel.

For maximum shelf life under elevated temperature conditions the electrolyte is given a preliminary content of potassium zincate by dissolving zinc oxide in the solution. The amount of zincate, calculated as zinc, preferably amounts to between 14 and 29 grams of zinc for each 100 grams of potassium present as potassium hydroxide and potassium zincate. Part of the potassium hydroxide originally used is converted to potassium zincate by reaction with the zinc oxide so that the percentage of KOH present as such in the solution is reduced. However, the titratable quantity of potassium hydroxide remains the same due to the reversibility of the reaction with the zinc oxide.

In operation of the cell, wherein the electrolyte is substantially saturated with zincate, a layer of zinc hydroxide is built up on the anode during use. In order to afford substantially complete consumption of the depolarizer the zinc anode surface in contact with such electrolytes is made greater than 20 square inches for each gram of oxygen available in the cathode.

Where the cells are not intended for storage under elevated temperature conditions the zincate in such proportions may not be required.

The curves of Figure 3 represent the output voltage characteristic curves for cells of the present invention under various loads and for a prior art cell of the same dimensions. Curve 30 represents the drop in voltage with time of a cell of the dimensions and preferred composition described, when connected to a 15 ohm load. Curve 31 represents the voltage drop in a similar cell when connected through a 10 ohm load, and curve 32 when connected through a 6 ohm load. Curve 33 is an output voltage curve for a pair of commercial Leclanche-type dry cells, each of the same volume as the cells of the present invention, connected in parallel to a 6 ohm load. The marked advantage in output capacity of cells of the present invention over prior art commercial dry cells is readily apparent. It will also be noted that cells of the present invention have a relatively flat output characteristic, that is, the output voltage does not drop greatly until near the end of cell life.

According to a modification of the invention the gel electrolyte element 12 may comprise an immobilized body of a weaker alkaline solution, for instance, ammonium hydroxide. Such an electrolyte is particularly useful in cells where heavy current drain is not contemplated, as in "B" batteries for hearing aid sets and similar units and in vacuum tube grid bias cells. In some hearing aid devices a current drain of only 0.2 of a milliampere is required.

A suitable ammonium hydroxide gel electrolyte element may be made by cooling a 28% ammonium hydroxide solution to 10° below zero centigrade, then adding 8 grams of sodium carboxymethylcellulose to 100 millilitres of solution. It is necessary to chill the solution before adding the gelling agent as gelling takes place too rapidly at room temperature or above. The dispersion is poured into the zinc can and the cathode assembly is inserted. The cell is then allowed to stand several hours at room temperature to form a clear gel and then the top assembly is added.

Other gelling agents which can be used with ammonium hydroxide solutions are starch and methyl cellulose.

Mercuric oxide mixed with graphite is the preferred cathode-depolarizer element for use with the ammonium hydroxide electrolyte.

While can 10 has been described as formed of zinc and the inside of the can as comprising part of the active anode surface, it is contemplated that in some cases can 10 may be formed of a metal or alloy inert to the electrolyte, and that corrugated member 11 will comprise the entire active anode. Amalgamated copper is the preferred metal for can 10 when used with the alkali metal hydroxide electrolytes. It is inert to the electrolyte and causes negligible local galvanic action in contact with the zinc anode in the cell combination described. The copper and amalgam makes a low resistance contact with the zinc anode and also provides a good external contact terminal for the cell. Copper is easier to work than most other metals which can be used. The amalgam used is malleable and not brittle. There is also less tendency of the alkaline electrolytes to creep along the copper surface. The copper container can be amalgamated by placing in a 3% mercuric nitrate solution at 100° C. for 5 minutes.

Other inert or substantially inert metals and alloys which can be used for can 10 are amalgamated copper cadmium, and copper zinc alloys of low zinc content and amalgamated cadium. Amalgamation may be carried on in the same way as for copper. Magnesium can be used without amalgamation with either the alkali metal hydroxide or ammonium hydroxide electrolytes.

Instead of prior amalgamation of the copper container, it is possible to obtain a satisfactory amalgam surface by silver plating the container, in which case amalgamation of the interior surface of the container takes place by contact with the amalgamated zinc anode.

The advantages of the inert container are most fully realized when the quantity of the zinc in the anode is balanced with the depolarizing capacity of the cathode so that the zinc is fully consumed when all the available oxygen in the cathode has been used. An exact balance is desirable for most efficient use of the cell materials, or a slight excess of depolarizer may be used. The cells are relatively free of end-of-life gassing in either event.

In one cell 3.5 grams of zinc was found to exactly balance 11.3 grams of depolarizer containing 95% mercuric oxide and 5% graphite, so that the zinc was completely consumed as the depolarizer ran out.

The terminal or container of amalgamated copper or other inert metal or alloy in contact with the zinc anode can also be used in cells of different structure, such as the structures illustrated in my co-pending applications Serial No. 604,269, filed July 10, 1945, now Patent No. 2,422,045, dated June 10, 1947, and Serial No. 631,402, filed November 28, 1945, now Patent No. 2,536,696, dated January 2, 1951.

The body of self-sustaining, non-flowing electrolyte gel described herein not only performs the usual function of cell electrolyte in undergoing electrochemical reaction with the electrodes and providing an electrolytically conductive path between them, but also functions as a mechanical spacer and as a barrier to the travel of deleterious compounds, graphite particles and reaction products from cathode to anode. The electrolyte being immobilized into a gel has no free circulation which would carry compounds from one electrode to the other.

What is claimed is:

1. An alkaline dry cell comprising an amalgamated metal can, a corrugated and perforated amalgamated zinc anode of higher surface area than the inside wall of said can lining said inside wall and having its corrugations in pressure contact with said wall and forming a permanent amalgam bond therewith, a cathode rod centrally disposed within said can, at least the surface of said cathode comprising a coherent conductive body containing an electrolytically reducible oxygen-yielding compound, and an aqueous alkaline electrolyte gel between and contacting said anode and cathode surfaces and substantially completely embedding said anode, said electrolyte containing potassium hydroxide as the active ingredient and an alkali metal salt of carboxy-methyl cellulose as the gelling agent, the metal of said can being inert to the electrolyte and having a low electrolytic potential with respect to zinc.

2. An alkaline dry cell comprising an amalgamated metal can, a corrugated and perforated amalgamated zinc anode of higher surface area than the inside wall of said can lining said inside wall and having its corrugations in pressure contact with said wall and forming a permanent amalgam bond therewith, a cathode rod centrally disposed within said can, at least the surface of said cathode comprising a coherent conductive body containing an electrolytically reducible oxygen-yielding compound, and an aqueous alkaline electrolyte gel between and contacting said anode and cathode surfaces and substantially completely embedding said anode, said electrolyte containing potassium hydroxide as the active ingredient and an alkali metal salt of carboxy-methyl cellulose as the gelling agent, said electrolyte also containing between 14 and 29 grams of zinc as potassium zincate for each 100 grams of potassium present as potassium hydroxide and potassium zincate, the metal of said can being inert to the electrolyte and having a low electrolytic potential with respect to zinc.

3. An alkaline dry cell comprising a can of amalgamated metal inert to the electrolyte and having low electrolytic potential with respect to zinc, a corrugated and perforated amalgamated zinc anode of higher surface area than the inside wall of said can lining said inside wall and having its corrugations in pressure contact with said wall and forming a permanent amalgam bond therewith, a cathode rod centrally disposed within said can, at least the surface of said cathode comprising a coherent conductive body containing an electrolytically reducible oxygen-yielding compound, and an alkaline electrolyte comprising an aqueous solution of an alkali metal hydroxide and a gelling agent between and contacting said cathode surface and the surfaces of said anode and substantially completely embedding the anode, said electrolyte being in the form of a gel.

4. An alkaline dry cell comprising a can of amalgamated metal inert to the electrolyte and having low electrolytic potential with respect to zinc, a corrugated and perforated amalgamated zinc anode of higher surface area than the inside wall of said can lining said inside wall and having its corrugations in pressure contact with said wall and forming a permanent amalgam bond therewith, a cathode rod centrally disposed within said can, at least the surface of said cathode comprising a coherent conductive body containing an electrolytically reducible oxygen-yielding compound, and an alkaline electrolyte comprising an aqueous solution of an alkali metal hydroxide and a gelling agent between and contacting said cathode surface and the surfaces of said anode and substantially completely embedding the anode, said electrolyte being in the form of a gel, an insulating plate disposed between the lower end of said cathode rod and the bottom of said can, a layer of yielding insulating material disposed over said electrolyte at the top of said can, a closure plate disposed above said yielding layer and secured to the edge of said can wall, said cathode rod having a conductive portion projecting through said yielding layer and closure plate.

5. A primary cell comprising an amalgamated can of metal inert to the electrolyte and having low electrolytic potential with respect to zinc, a corrugated and perforated amalgamated zinc sheet lining the cylindrical wall of said can and having its corrugations forming a permanent amalgam bond therewith, said amalgam bond constituting positive electrical and mechanical connection between said can and said zinc sheet throughout the useful life of the cell, a threaded steel rod axially disposed within said can, a coherent conductive layer of depolarizing material containing an electrolytically reducible oxygen-yielding compound bonded to the threaded surface of said steel rod, and an alkaline electrolyte comprising an aqueous solution of an alkali metal hydroxide in the form of an immobile gel interposed between and contacting said depolarizing layer and said corrugated zinc sheet and substantially completely embedding said sheet.

6. A dry cell anode sub-assembly comprising an amalgamated metal can and an amalgamated corrugated zinc sheet member lining the inside wall of said can and having its corrugations forming a permanent amalgam bond therewith, which constitutes positive electrical and mechanical connection between said can and said zinc sheet member, said sheet member having perforations distributed over its area to provide electrolyte paths therethrough, said zinc sheet member having a higher surface area than the inside wall of said can, and said can being formed of a metal inert to the cell electrolyte and having a low electrolytic potential with respect to zinc.

7. An alkaline dry cell comprising a can of amalgamated metal inert to the electrolyte and having low electrolytic potential with respect to zinc, a corrugated and perforated amalgamated zinc sheet anode having its corrugations in pressure contact with the inner surface of said can and forming a permanent amalgam bond therewith, a cathode rod centrally disposed within said can, at least the surface of said cathode comprising a coherent conductive body containing an electrolytically reducible oxygen-yielding compound, and an aqueous alkaline electrolyte gel between and contacting said anode and cathode surfaces and substantially completely embedding said anode, said electrolyte containing ammonium hydroxide as the active ingredient, and a gelling agent.

8. An alkaline dry cell comprising an amalgamated can of copper base metal, an amalgamated corrugated and perforated zinc anode lining the inside wall of said can and having its corrugations forming a permanent amalgam bond therewith, said amalgam bond constituting positive electrical and mechanical connection between said can and said zinc anode throughout the useful life of the cell, a cathode rod centrally disposed within said can, at least the surface of said cathode comprising a coherent conductive body containing an electrolytically-reducible oxygen-yielding compound, and an aqueous alkaline electrolyte gel between and contacting said anode and cathode surfaces and substantially completely embedding said anode.

9. An alkaline dry cell comprising an amalgamated can of metal inert to the electrolyte and having a low electrolytic potential with respect to zinc, an amalgamated corrugated and perforated zinc anode lining the inside wall of said can and having its corrugations forming a permanent amalgam bond therewith, said amalgam bond constituting positive electrical and mechanical connection between said can and said zinc anode throughout the useful life of the cell, a cathode rod centrally disposed within said can, at least the surface of said cathode comprising a coherent conductive depolarizer body containing an electrolytically-reducible oxygen-yielding compound, and an aqueous alkaline electrolyte gel between and contacting said anode and cathode surfaces and substantially completely embedding said anode, the quantity of zinc in the anode being balanced with respect to the quantity of oxygen in the cathode available for depolarization.

SAMUEL RUBEN.

(References on following page)

REFERENCES CITED

The following references are of record in the file of this patent:

UNITED STATES PATENTS

| Number | Name | Date |
|---|---|---|
| 577,282 | Burnet | Feb. 16, 1897 |
| 720,592 | Kohn | Feb. 17, 1903 |
| 905,952 | Szek | Dec. 8, 1908 |
| 1,090,372 | Achenbach | Mar. 17, 1914 |
| 1,137,226 | Manchester | Apr. 27, 1915 |
| 1,219,074 | Bronsted | Mar. 13, 1917 |
| 1,390,696 | Gertler | Sept. 13, 1921 |
| 1,395,282 | Koretzky | Nov. 1, 1921 |
| 1,558,413 | Teitelbaum | Oct. 20, 1925 |
| 1,991,132 | Anthony | Feb. 12, 1935 |
| 2,198,423 | Anthony | Apr. 23, 1940 |

FOREIGN PATENTS

| Number | Country | Date |
|---|---|---|
| 16,471 | Great Britain | of 1915 |
| 195,580 | Great Britain | Oct. 12, 1923 |
| 380,707 | France | Oct. 17, 1907 |
| 826,859 | France | Dec. 23, 1940 |

OTHER REFERENCES

Hollabaugh et al., Ind. and Eng. Chem., October 1945, pages 943–4.